(12) United States Patent
Baldwin et al.

(10) Patent No.: US 12,126,159 B1
(45) Date of Patent: *Oct. 22, 2024

(54) EXPANDABLE CORD PROTECTOR

(71) Applicant: Titan3 Technology LLC, Tempe, AZ (US)

(72) Inventors: Jeffrey P. Baldwin, Anthem, AZ (US); John E. Klein, Chandler, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,517

(22) Filed: Jun. 3, 2023

Related U.S. Application Data

(63) Continuation of application No. 17/728,805, filed on Apr. 25, 2022, now Pat. No. 11,715,944, which is a
(Continued)

(51) Int. Cl.
*H02G 9/04* (2006.01)
*H02G 3/04* (2006.01)
*H02G 9/02* (2006.01)

(52) U.S. Cl.
CPC ............. *H02G 9/04* (2013.01); *H02G 3/0418* (2013.01); *H02G 3/0437* (2013.01); *H02G 9/025* (2013.01)

(58) Field of Classification Search
CPC .................................................. H02G 3/0418
See application file for complete search history.

(56) References Cited

U.S. PATENT DOCUMENTS

| | | | | | |
|---|---|---|---|---|---|
| 274,611 | A | * | 3/1883 | Johnstone | ................ H02G 9/04 256/45 |
| 2,261,077 | A | * | 10/1941 | Schultz | ................... E04B 2/825 52/241 |

(Continued)

FOREIGN PATENT DOCUMENTS

| | | | |
|---|---|---|---|
| DE | 10158166 C1 | 3/2003 | |
| FR | 2835036 A1 * | 7/2003 | .......... H02G 3/0418 |
| WO | 9419852 A1 | 9/1994 | |

OTHER PUBLICATIONS

Notice of Allowance dated Apr. 7, 2023 for U.S. Appl. No. 17/728,805 (pp. 1-11).
(Continued)

*Primary Examiner* — Krystal Robinson
(74) *Attorney, Agent, or Firm* — Kenneth C. Booth; Booth Udall Fuller, PLC

(57) ABSTRACT

A cord protector with an elongated body and a coupler that joins the elongated body to an adjacent elongated body to form an elongated cord protector system. The elongated body has a base and a lid. The base has a channel extending between a first end and a second end. The base also has ridges that extend into the channel, a cavity configured to mate with the coupler, and a central pillar that extends from the floor into the channel along a majority of the channel. The lid is configured to be inserted into the channel. The lid has two grooves that are sized and shaped to receive one of the ridges. The lid also has a slot configured to receive the top of the central pillar when the lid is inserted into the channel. The central pillar supports the lid when the lid is inserted into the channel.

18 Claims, 15 Drawing Sheets

Related U.S. Application Data continuation-in-part of application No. 16/749,672, filed on Jan. 22, 2020, now Pat. No. 11,489,320.

(60) Provisional application No. 62/795,323, filed on Jan. 22, 2019.

(56) References Cited

U.S. PATENT DOCUMENTS

| | | | |
|---|---|---|---|
| 3,029,303 A | 4/1962 | Severino | |
| 3,110,753 A | 11/1963 | Witort | |
| 3,374,590 A * | 3/1968 | Kessler | E04F 19/064 |
| | | | 52/312 |
| 3,761,603 A | 9/1973 | Hays | |
| 4,286,630 A * | 9/1981 | Happer | F16L 3/26 |
| | | | 138/116 |
| 4,349,220 A * | 9/1982 | Carroll | H02G 3/0608 |
| | | | 138/155 |
| 4,391,426 A * | 7/1983 | Gothberg | H02G 3/0431 |
| | | | 174/101 |
| 4,589,449 A | 5/1986 | Bramwell | |
| 4,857,670 A | 8/1989 | Frank | |
| 4,907,767 A * | 3/1990 | Corsi | H02G 3/0437 |
| | | | 174/101 |
| 4,937,400 A | 6/1990 | Williams | |
| 5,031,083 A | 7/1991 | Claesson | |
| 5,095,822 A * | 3/1992 | Martin | H02G 9/04 |
| | | | 174/101 |
| 5,267,367 A * | 12/1993 | Wegmann, Jr. | A62C 33/06 |
| | | | 52/220.5 |
| 5,758,456 A | 6/1998 | Case | |
| 5,802,672 A * | 9/1998 | Rohder | H02G 3/0437 |
| | | | 16/95 R |
| 5,942,729 A | 8/1999 | Carlson, Jr. | |
| 6,029,713 A * | 2/2000 | Miranda | H02G 3/0418 |
| | | | 174/651 |
| 6,126,123 A * | 10/2000 | Yang | B60R 16/0215 |
| | | | 248/74.1 |
| 6,143,984 A | 11/2000 | Auteri | |
| 6,216,746 B1 * | 4/2001 | Guebre-Tsadik | H02G 3/0608 |
| | | | 138/158 |
| 6,234,429 B1 | 5/2001 | Yang | |
| 6,284,975 B1 | 9/2001 | McCord | |
| 6,384,336 B1 * | 5/2002 | VanderVelde | H02G 3/128 |
| | | | 174/95 |
| 6,437,244 B1 | 8/2002 | Vander Velde | |
| 6,501,026 B1 * | 12/2002 | Piole | H02G 3/0608 |
| | | | 138/155 |
| 6,646,203 B1 * | 11/2003 | Liao | H02G 3/0418 |
| | | | 174/95 |
| 6,693,238 B2 | 2/2004 | Jadaud | |
| 6,972,367 B2 | 12/2005 | Federspiel | |
| 7,344,163 B2 * | 3/2008 | Thompson | H02G 3/0608 |
| | | | 138/155 |
| 7,408,114 B2 | 8/2008 | Vandervelde | |
| 7,470,859 B1 | 12/2008 | Gretz | |
| 7,514,628 B2 | 4/2009 | Kadrnoska | |
| 7,762,042 B2 * | 7/2010 | Packard, III | H02G 3/0608 |
| | | | 403/294 |
| 7,810,197 B1 * | 10/2010 | Anthony | F16L 3/2235 |
| | | | 174/97 |
| 7,854,527 B2 | 12/2010 | Anderson | |
| 8,785,779 B1 | 7/2014 | Jones | |
| D715,994 S | 10/2014 | Klus | |
| D717,248 S | 11/2014 | Coffman | |
| 8,979,590 B2 | 3/2015 | Magno | |
| 9,022,432 B2 | 5/2015 | Firestine | |
| D843,329 S * | 3/2019 | Baldwin | D13/155 |
| 10,790,650 B2 | 9/2020 | Faith | |
| 10,862,283 B1 | 12/2020 | Hansen | |
| 10,935,165 B2 | 3/2021 | Alban | |
| 10,995,885 B2 | 5/2021 | Morton | |
| 10,998,702 B2 | 5/2021 | Strong | |
| D920,881 S | 6/2021 | Sheehan | |
| 2002/0036095 A1 * | 3/2002 | Ewer | H02G 3/0608 |
| | | | 174/97 |
| 2002/0108771 A1 | 8/2002 | Fu-Chung | |
| 2003/0051892 A1 | 3/2003 | Mattei | |
| 2004/0014340 A1 | 1/2004 | Vargas | |
| 2005/0074223 A1 | 4/2005 | Moore | |
| 2005/0098340 A1 | 5/2005 | Herzog | |
| 2006/0201696 A1 * | 9/2006 | Fox | H02G 9/04 |
| | | | 174/95 |
| 2007/0044987 A1 * | 3/2007 | VanderVelde | H02G 3/0437 |
| | | | 174/72 A |
| 2009/0242066 A1 | 10/2009 | McKane | |
| 2010/0224388 A1 | 9/2010 | Lubanski | |
| 2016/0229357 A1 | 8/2016 | Renner | |

OTHER PUBLICATIONS

Notice of Allowance dated May 1, 2023 for U.S. Appl. No. 17/728,805 (pp. 1-6).

Office Action dated Jan. 6, 2023 for U.S. Appl. No. 17/728,805 (pp. 1-18).

* cited by examiner

EXPANDABLE CORD PROTECTOR

CROSS REFERENCE TO RELATED APPLICATIONS

This application is a continuation of U.S. Utility patent application Ser. No. 17/728,805 entitled "Expandable Cord Protector" to Jeffrey P. Baldwin et al., filed on Apr. 25, 2022, which application is a continuation-in-part application of U.S. Utility patent application Ser. No. 16/749,672 entitled "Expandable Cord Protector" to Jeffrey P. Baldwin et al., filed on Jan. 22, 2020, which application claims the benefit of the filing date of U.S. Provisional Patent Application 62/795,323 entitled "Expandable Cord Cover" to Jeffrey P. Baldwin et al., filed on Jan. 22, 2019, the disclosures of which are each hereby incorporated herein by this reference.

TECHNICAL FIELD

Aspects of this document relate generally to an expandable electrical cord protector.

BACKGROUND

As consumer products have increasingly required electricity to function, the need for a residential room to provide sources of electricity has also increased. However, many living spaces only provide one or two electrical outlets. For this reason, extension cords have become a common solution. Many users have extension cords permanently in use in conjunction with a cord protector to prevent people from tripping on the cord, to keep the cords in place, and to make the cord's appearance more sightly.

However, despite being the solution to one problem, current state-of-the-art cord protectors have some problems of their own. First, most cord protectors are sold in predetermined lengths. While many cords are sold in lengths of 25', 50', 100', etc., cord protectors are often sold in shorter lengths, such as 5' and 15'. This makes it difficult to completely protect a cord, especially if the cord protectors cannot be connected together.

In addition, residential cord protectors are made from a rubber or soft vinyl material and can therefore crush if enough weight is placed on them. This puts the cord inside of the cord protector at risk. While there are commercial grade cord protectors on the market which are made from rigid materials, these are prohibitively expensive for most homeowners. Thirdly, residential cord protectors are sold in a coil. Users must straighten the cord protector before use, but this is often difficult to do. Many cord protectors are never quite able to remain flat on a surface, and therefore do not effectively eliminate trip hazards and keep the cord in place.

What is needed is a cord protector which can be adjusted to any length, is rigid but inexpensive to make, and can be packaged, transported, and stored without using a coil, thus removing the need for straightening.

SUMMARY

Aspects of this document relate to a cord protector, comprising at least two elongated bodies extruded from a first material and each having a base having a first end, a second end, a channel with a floor and two walls each with a top edge, the channel extending between the first end and the second end, two ridges each extending into the channel adjacent one of the two top edges, a cavity separate from the channel longitudinally disposed in each of the first end and the second end, and a central pillar extending from the floor into the channel for a majority of a length of the channel, and a lid configured to be inserted into and cover the channel, the lid having two grooves each sized and shaped to receive one of the ridges and a slot configured to receive a top of the central pillar when the lid is inserted into the channel, wherein the central pillar supports the lid when the lid is inserted into the channel, and at least one coupler having a leading end configured to mate with the cavity in the first end of a first of the at least two elongated bodies and a trailing end configured to mate with the cavity in the second end of a second of the at least two elongated bodies to form an elongated cord protector system.

Particular embodiments may comprise one or more of the following features. The base may further have two ledges configured to support the lid when the lid is inserted into the channel, wherein each of the two ledges extends into the channel below the two ridges. the at least one coupler may further have at least one tab moveable between a protruding position wherein the at least one tab extends below the at least one coupler and an aligned position wherein the at least one tab is aligned with the at least one coupler, wherein the at least one tab is biased toward the protruding position. The lid may be inserted into the channel by sliding into the channel from one of the first end or second end of the base with each of the two ridges inside one of the two grooves. The lid may be inserted into the channel by snapping the two grooves of the lid around the two ridges of the base. The cord protector may further comprise a gripping material coupled to a bottom surface of the base.

Aspects of this document relate to a cord protector, comprising at least one elongated body extruded from a first material and having a base having a first end, a second end, a channel with a floor and two walls extending between the first end and the second end, two ridges each extending from one of the two walls into the channel, a cavity separate from the channel disposed in each of the first end and the second end, and a central pillar extending from the floor into the channel longitudinally within the channel, and a lid configured to be inserted into and cover the channel, the lid having two grooves each sized and shaped to receive one of the ridges and a slot configured to receive a top of the central pillar when the lid is inserted into the channel, wherein the central pillar supports the lid when the lid is inserted into the channel, and at least one coupler having a leading end configured to mate with the cavity of the first end of the at least one elongated body and a trailing end configured to mate with the cavity of the second end of the at least one elongated body.

Particular embodiments may comprise one or more of the following features. Each of the two ridges may extend from one of the two walls adjacent a top edge of the one of the two walls. The base may further have two ledges configured to support the lid when the lid is inserted into the channel, wherein each of the two ledges extends into the channel below the two ridges. The at least one coupler may further have at least one tab moveable between a protruding position wherein the at least one tab extends below the at least one coupler and an aligned position wherein the at least one tab is aligned with the at least one coupler, wherein the at least one tab is biased toward the protruding position. The lid may be inserted into the channel by snapping the two grooves of the lid around the two ridges of the base. The cord protector may further comprise a gripping material coupled to a bottom surface of the base.

Aspects of this document relate to a cord protector, comprising at least one elongated body having a base having a first end, a second end, a channel extending between the first end and the second end, at least one ridge extending into the channel, and a central pillar extending from a floor of the channel into the channel, and a lid configured to be inserted into and cover the channel, the lid having at least one groove sized and shaped to receive the at least one ridge, wherein the central pillar supports the lid when the lid is inserted into the channel, and at least one coupler having a leading end and a trailing end, the leading end configured to mate with the first end of the at least one elongated body.

Particular embodiments may comprise one or more of the following features. The base may further have a cavity separate from the channel disposed in each of the first end and the second end, wherein the leading end of the at least one coupler is configured to mate with the cavity of the first end of the at least one elongated body. The lid may further have a slot configured to receive a top of the central pillar when the lid is inserted into the channel. The at least one ridge may extend from the channel adjacent a top edge of the channel. The base may further have at least one ledge configured to support the lid when the lid is inserted into the channel, wherein the at least one ledge extends into the channel below the at least one ridge. The at least one coupler may further have at least one tab moveable between a protruding position wherein the at least one tab extends below the at least one coupler and an aligned position wherein the at least one tab is aligned with the at least one coupler, wherein the at least one tab is biased toward the protruding position. The lid may be inserted into the channel by snapping the at least one groove of the lid around the at least one ridge of the base. The central pillar may extend from the floor into the channel for a majority of a length of the channel.

Aspects of this document relate to cord protectors which may comprise at least two elongated bodies extruded from a first material and having a base having a first end, a second end, and a channel with two top edges and two ridges, each ridge adjacent one of the two top edges, the first end and second end each having a cavity longitudinally disposed in the first end and the second end, wherein the cavity of the first end has a first cross section that is the same as a second cross section of the cavity of the second end, and a lid having two grooves, each of the two grooves sized and shaped to receive one of the ridges, the lid configured to insert into and cover the channel, and at least one coupler having a leading end and a trailing end, wherein the leading end of the at least one coupler is sized and shaped to mate with the cavity of the first end of the at least two elongated bodies and the trailing end of the at least one coupler is sized and shaped to mate with the cavity of the second end of the at least two elongated bodies, the leading end of the at least one coupler coupled with the first end of a first of the at least two elongated bodies, and the trailing end of the at least one coupler coupled with the second end of a second of the at least two elongated bodies to form an elongated cord protector system.

Particular embodiments may comprise one or more of the following features. The first end of the second of the at least two elongated bodies may be coupled with the leading end of a second of the at least one coupler and the second end of a third of the at least two elongated bodies may be coupled with the trailing end of the second of the at least one coupler. The lid may insert into the channel by sliding into the channel from one of the first end or second end of the base with each of the two ridges inside one of the two grooves. The lid may insert into the channel by snapping the two grooves of the lid around the two ridges of the base. The cord protector may further comprise a gripping material coupled to a bottom surface of the base and configured to attach the cord protector to a surface on which the cord protector rests. The gripping material may be a hook-type fabric configured to attach to carpet. The gripping material may be an adhesive configured to grip a hard surface.

Aspects of this document relate to cord protectors which may comprise at least one elongated body extruded from a first material and having a base having a first end, a second end, and a channel with two ridges, the first end and second end each having a cavity disposed in the first end and the second end, and a lid having two grooves, each of the two grooves sized and shaped to receive one of the ridges, the lid configured to insert into and cover the channel, and at least one coupler having a leading end and a trailing end, wherein the leading end of the at least one coupler is sized and shaped to mate with the cavity of the first end of the at least one elongated body and the trailing end of the at least one coupler is sized and shaped to mate with the cavity of the second end of the at least one elongated body, the leading end of the at least one coupler coupled with the first end of the at least one elongated body.

Particular embodiments may comprise one or more of the following features. The trailing end of the at least one coupler may be coupled with the second end of a second of the at least two elongated bodies. The cavity of the first end may have a first cross section that is the same as a second cross section of the cavity of the second end. The lid may insert into the channel by sliding into the channel from one of the first end or second end of the base with each of the two ridges inside one of the two grooves. The lid may insert into the channel by snapping the two grooves of the lid around the two ridges of the base. The cord protector may further comprise a gripping material coupled to a bottom surface of the base and configured to attach the cord protector to a surface on which the cord protector rests.

Aspects of this document relate to cord protectors which may comprise at least one elongated body having a base having a first end, a second end, and a channel with at least one ridge extending along a length of the channel, a lid having at least one groove, the at least one groove sized and shaped to receive the at least one ridge, the lid configured to insert into and cover the channel, and at least one coupler having a leading end and a trailing end, the leading end of the at least one coupler coupled with the first end of the at least one elongated body.

Particular embodiments may comprise one or more of the following features. The trailing end of the at least one coupler may be coupled with the second end of a second of the at least two elongated bodies. The first end and second end may each have a cavity, wherein the leading end of the at least one coupler is sized and shaped to insert into the cavity of the first end of the at least one elongated body and the trailing end of the at least one coupler is sized and shaped to insert into the cavity of the second end of the at least one elongated body. The at least one ridge may be two ridges and the at least one groove may be two grooves. The lid may insert into the channel by sliding into the channel from one of the first end or second end of the base with the at least one ridge inside the at least one groove. The lid may insert into the channel by snapping the at least one groove of the lid around the at least one ridge of the base. The cord protector may further comprise a gripping material coupled to a bottom surface of the base and configured to attach the cord protector to a surface on which the cord protector rests.

Aspects of this document relate to cord protectors which may comprise a first end having a U-shaped protrusion with a lip extending outward from the protrusion, a second end having a cavity sized and shaped to receive the protrusion and a groove within the cavity sized and shaped to receive the lip of the protrusion, wherein the second end of the cord protector is configured to couple with the first end of a second cord protector, and an elongated body extending between the first end and the second end and having a cord track having a base, a first track wall, and a second track wall, the first track wall and the second track wall both extending upward from the base, wherein the first track wall and the second track wall are spaced to allow at least one cord to rest between the first track wall and the second track wall, a hinge coupled to the base and adjacent the first track wall, a lid coupled to the hinge and configured to rotate about the hinge to cover the cord track, the lid having an edge with a lid latch, and a base latch coupled to the base and adjacent the second track wall, the base latch configured to releasably couple with the lid latch of the lid.

Particular embodiments may comprise one or more of the following features. The hinge may be a living hinge. The cord protector may be of a unitary construction. The cord protector may be constructed of a rigid material. The cord protector may further comprise a gripping material coupled to a bottom surface of the base and configured to attach the cord protector to a surface on which the cord protector rests. The gripping material may be a hook-type fabric configured to attach to carpet. The gripping material may be an adhesive configured to grip a hard surface.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This document features an expandable electrical cord protector. There are many features of an expandable cord protector disclosed herein, of which one, a plurality, or all features or steps may be used in any particular implementation.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 1:
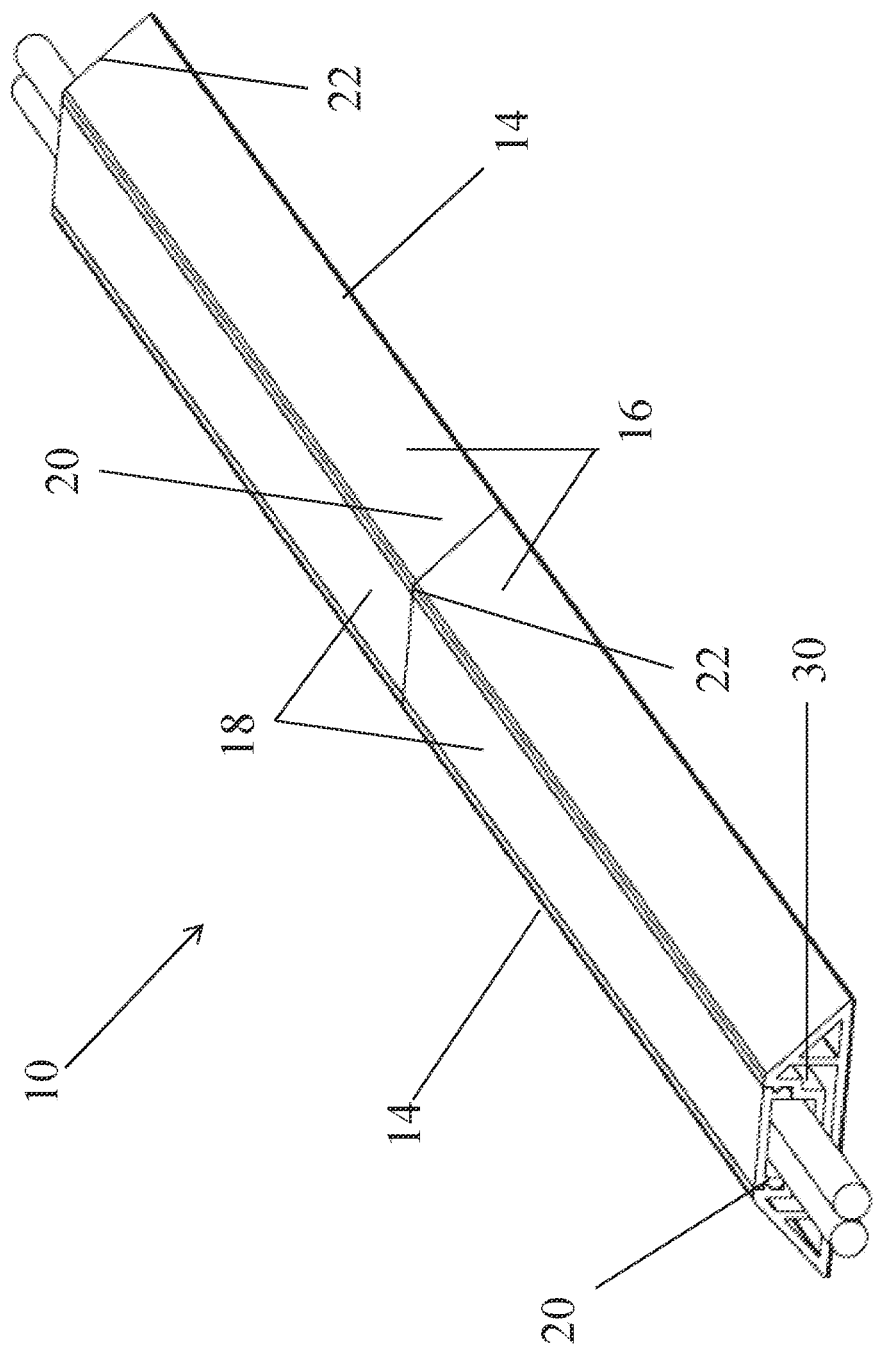
FIG. 1 is a perspective view of a cord protector with a cord extending therethrough.
Figure 2:
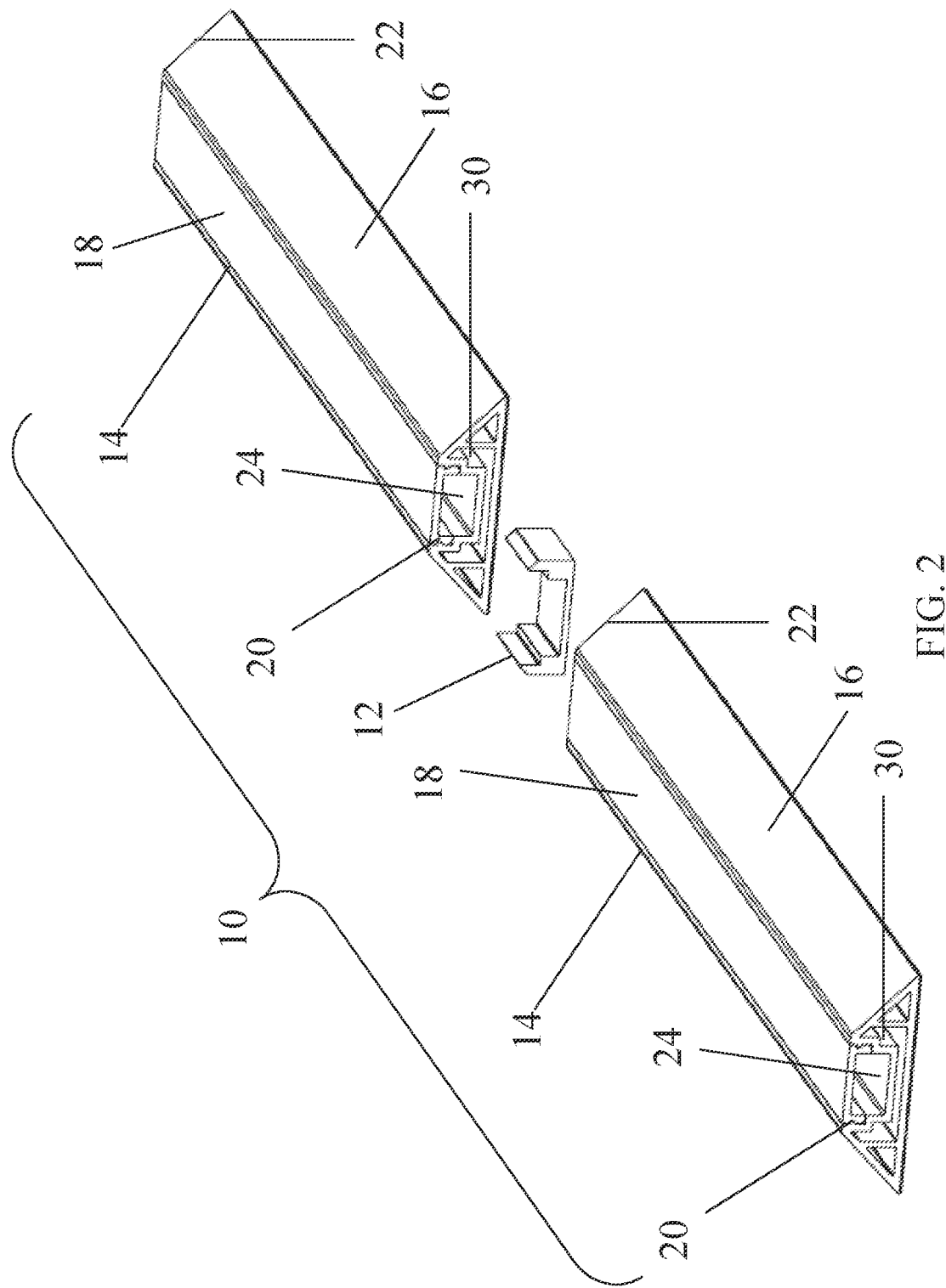
FIG. 2 is an exploded view of the cord protector of FIG. 1.

FIG. 1 and FIG. 2 depict a first embodiment of an expandable cord protector 10 system. The cord protector 10 has at least one coupler 12 and at least one elongated body 14 with a base 16 and a lid 18. The elongated body 14 may be extruded from a first material. The base 16 has a first end 20, a second end 22 opposite the first end 20, and a channel 24 that extends between the first end 20 and the second end 22. The first end 20 and the second end 22 may each have a cavity 30 longitudinally disposed in the first end 20 and the second end 22. The cavity 30 of the first end 20 may have a first cross section that is the same as a second cross section of the cavity 30 of the second end 22. The expandable cord protectors 10 may be formed through extrusion, establishing a consistent channel 24 and cavity 30 extending from the first end 20 of the expandable cord protectors 10 to the second end 22.

Figure 3:
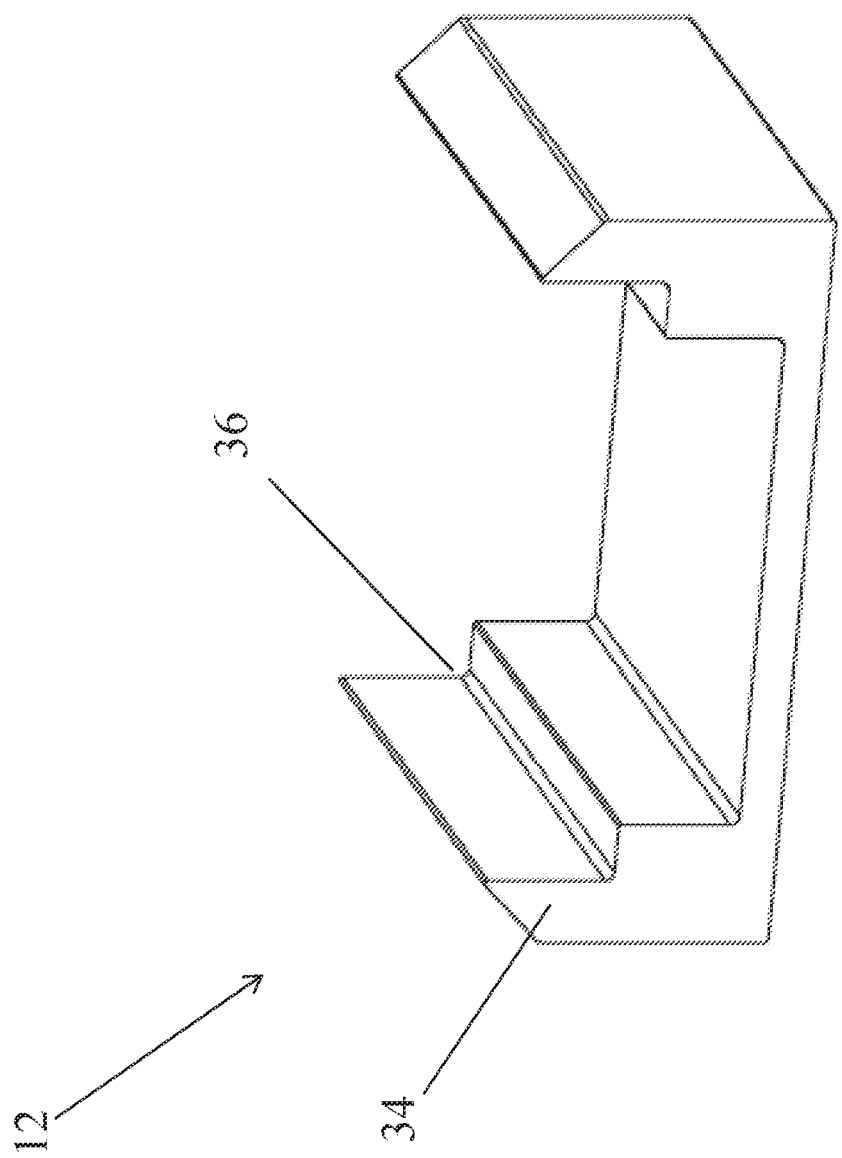
FIG. 3 is a perspective view of the coupler of the cord protector of FIG. 1.

As shown in FIG. 3, the coupler 12 has a leading end 34 and a trailing end 36. The leading end 34 of the coupler 12 may be sized and shaped to mate with the cavity 30 of the first end 20 of the elongated body 14. The trailing end 36 of the coupler 12 may be sized and shaped to mate with the cavity 30 of the second end 22 of the elongated body 14. When two elongated bodies 14 are joined together by a coupler 12, the leading end 34 of the coupler 12 is coupled with the first end 20 of a first of the two elongated bodies 14 and the trailing end 36 is coupled with the second end 22 of a second of the elongated bodies 14. This pattern may be followed to join additional elongated bodies 14 and form an elongated cord protector system. For example, to join a third elongated body 14, the first end 20 of the second of the two elongated bodies 14 is coupled with the leading end 34 of a second coupler 12 and the second end 22 of the third elongated body 14 is coupled with the trailing end 36 of the second coupler 12. In this manner, any length of cord may be protected by changing the number of cord protectors 10 that are used.

Figure 4:
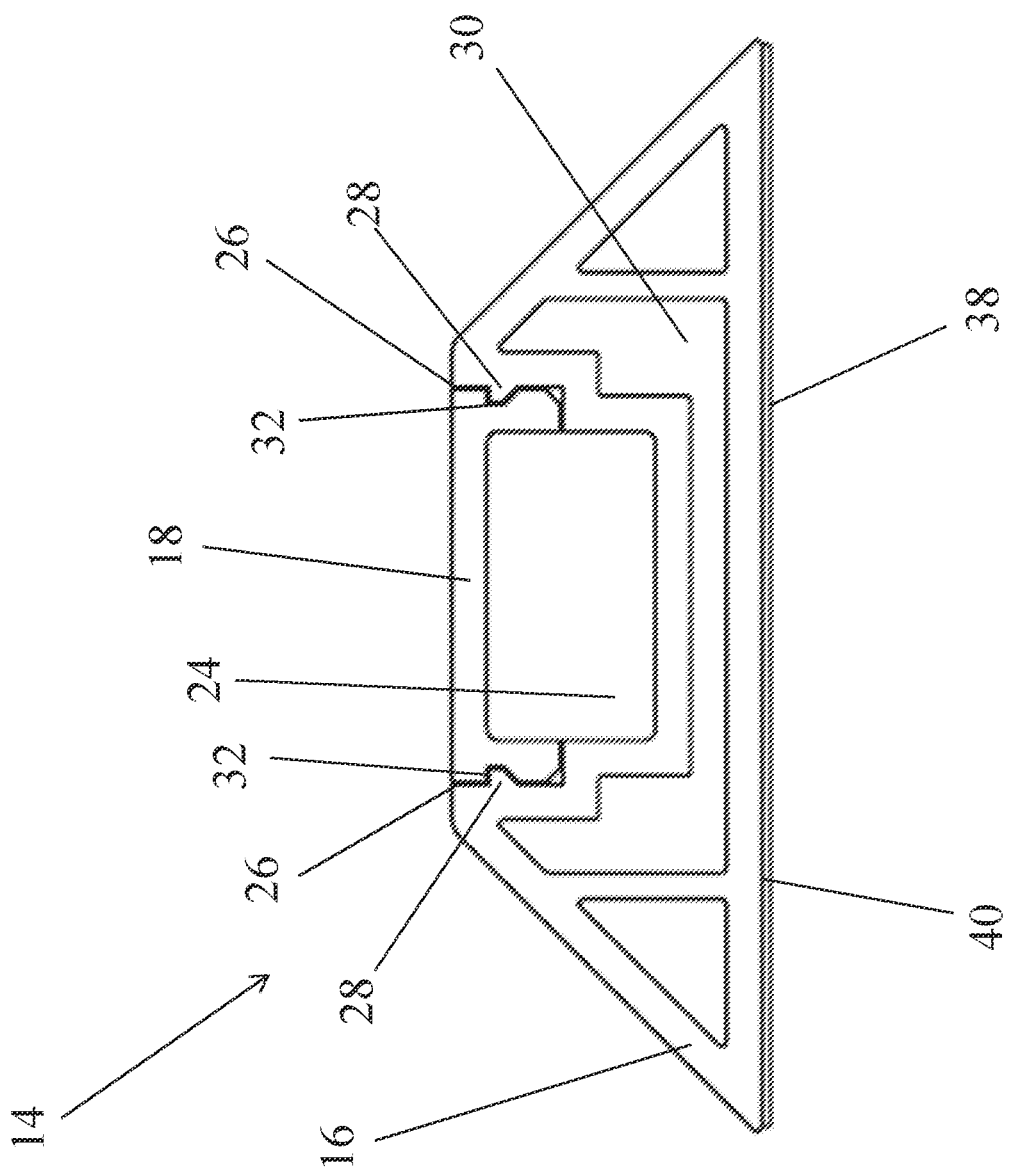
FIG. 4 is an end view of an elongated body of the cord protector of FIG. 1.
Figure 5:
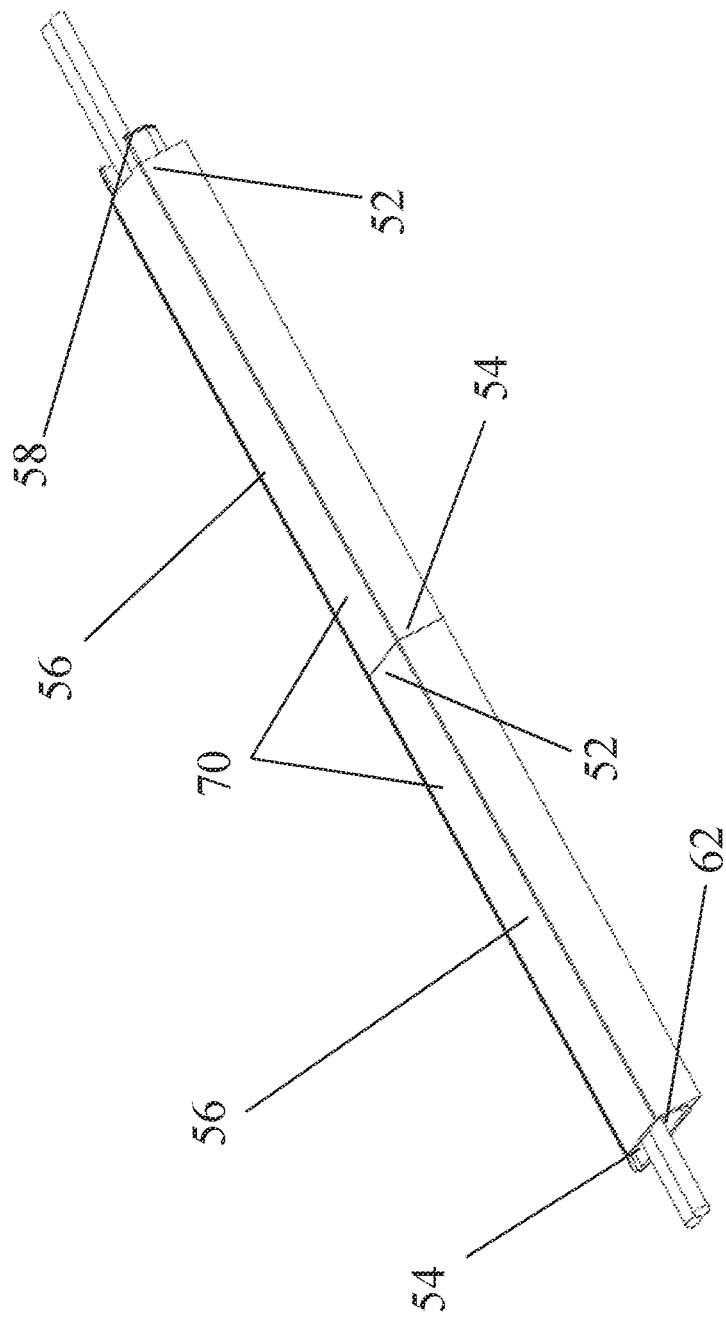
FIG. 5 is a perspective view of a second embodiment of a cord protector coupled with a second cord protector with a cord extending therethrough.
Figure 6:
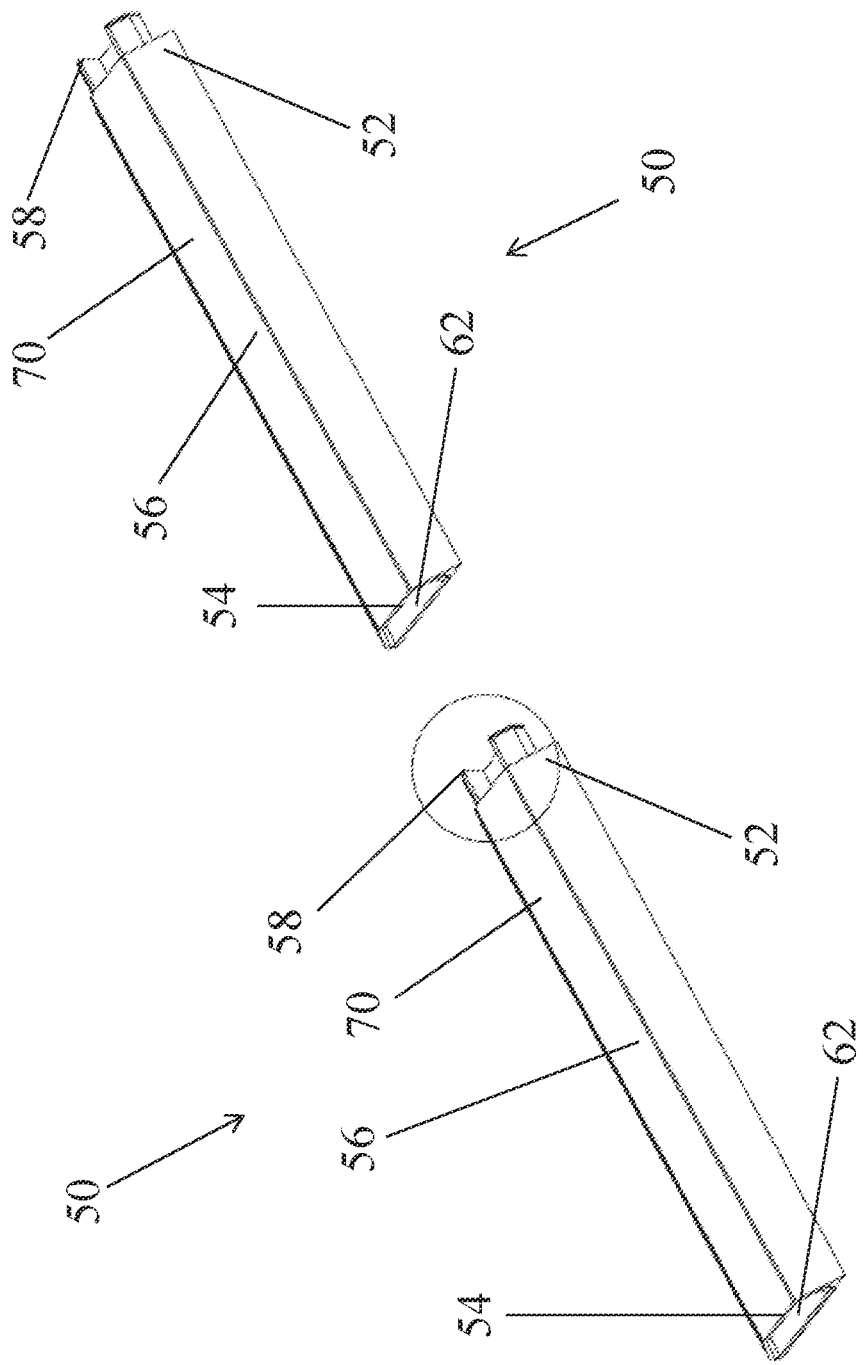
FIG. 6 is an exploded view of the two cord protectors of FIG. 5.
Figure 7:
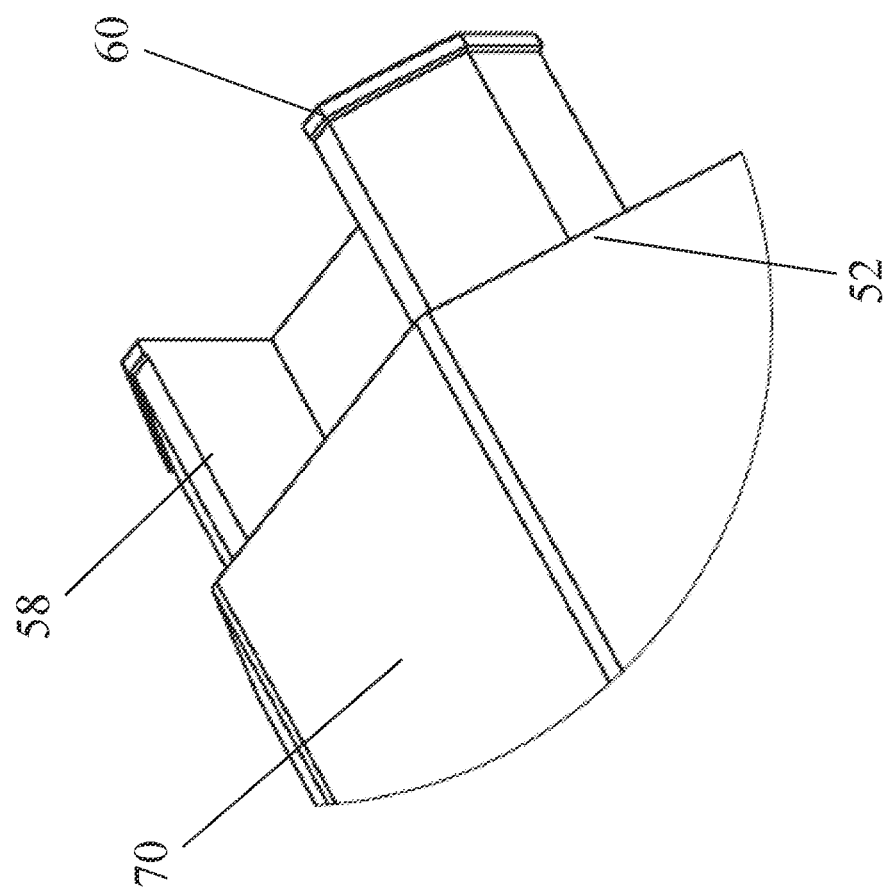
FIG. 7 is a close-up view of the first end of the cord protector of FIG. 5.
Figure 8:
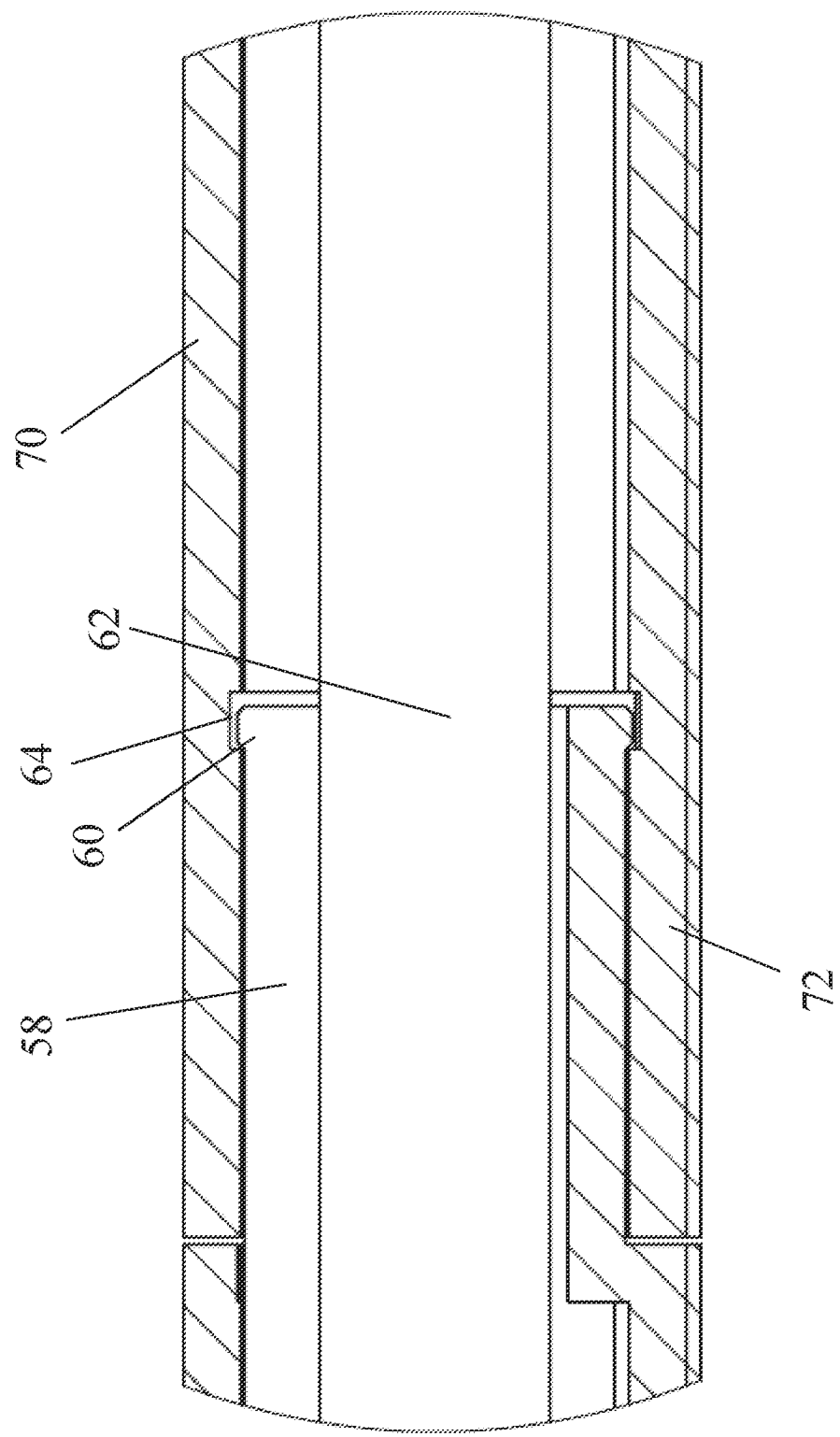
FIG. 8 is a cross sectional view of the two cord protectors of FIG. 5 showing the first end of the first cord protector inserted into the second end of the second cord protector.

FIG. 4 depicts an end view of the elongated body 14. The channel 24 may have two top edges 26 and two ridges 28, with each ridge 28 adjacent one of the two top edges 26. The lid 18 may have one or more grooves 32. Each of the grooves 32 may be sized and shaped to receive one of the ridges 28. The lid 18 is configured to insert into and cover the channel 24. The lid 18 may insert into the channel 24 by sliding into the channel from either the first end 20 or the second end 22 of the base 16, or by snapping the lid 18 directly downward against the channel 24 with both grooves 32 of the lid engaging respective ridges 28 of the channel 24. In embodiments with ridges 28, the ridges 28 may slide or snap into one of the grooves 32, thus securing the lid 18 inside of the channel 24.

The base 16 may further include an optional gripping material 38 coupled to the bottom surface 40 of the base 16. The gripping material 38 is configured to attach the cord protector 10 to a surface on which the cord protector 10 rests. Without limitation, the gripping material 38 may be a hook-type fabric that attaches to carpet, an adhesive configured to grip a hard surface, such as double-sided tape, a rubberized coating to increase friction between the bottom surface 40 of the base 16 and the surface on which the cord protector 10 rests, or some other friction enhancing material known in the art.

FIGS. 5-8 depict a second embodiment of an expandable cord protector 50. The cord protector 50 has a first end 52, a second end 54, and an elongated body 56. The first end 52 has a protrusion 58 with a lip 60 extending outward from the protrusion 58 (see FIG. 7 and FIG. 8). The protrusion 58 may have a U-shaped cross section (see FIG. 7). The second end 54 has a cavity 62 that is sized and shaped to receive the protrusion 58. Within the cavity 62 there may be a groove or recess 64 that is sized and shaped to receive the lip 60 of the protrusion 58 (see FIG. 8). Two cord protectors 50 may be coupled together by inserting the protrusion 58 into the cavity 62. The lip 60 interlocks with the groove 64, securing the two cord protectors 50 together (see FIG. 8). This may be implemented with any number of cord protectors 50, thus enabling a user to use the cord protector 50 to protect any length of cord.

Figure 9:
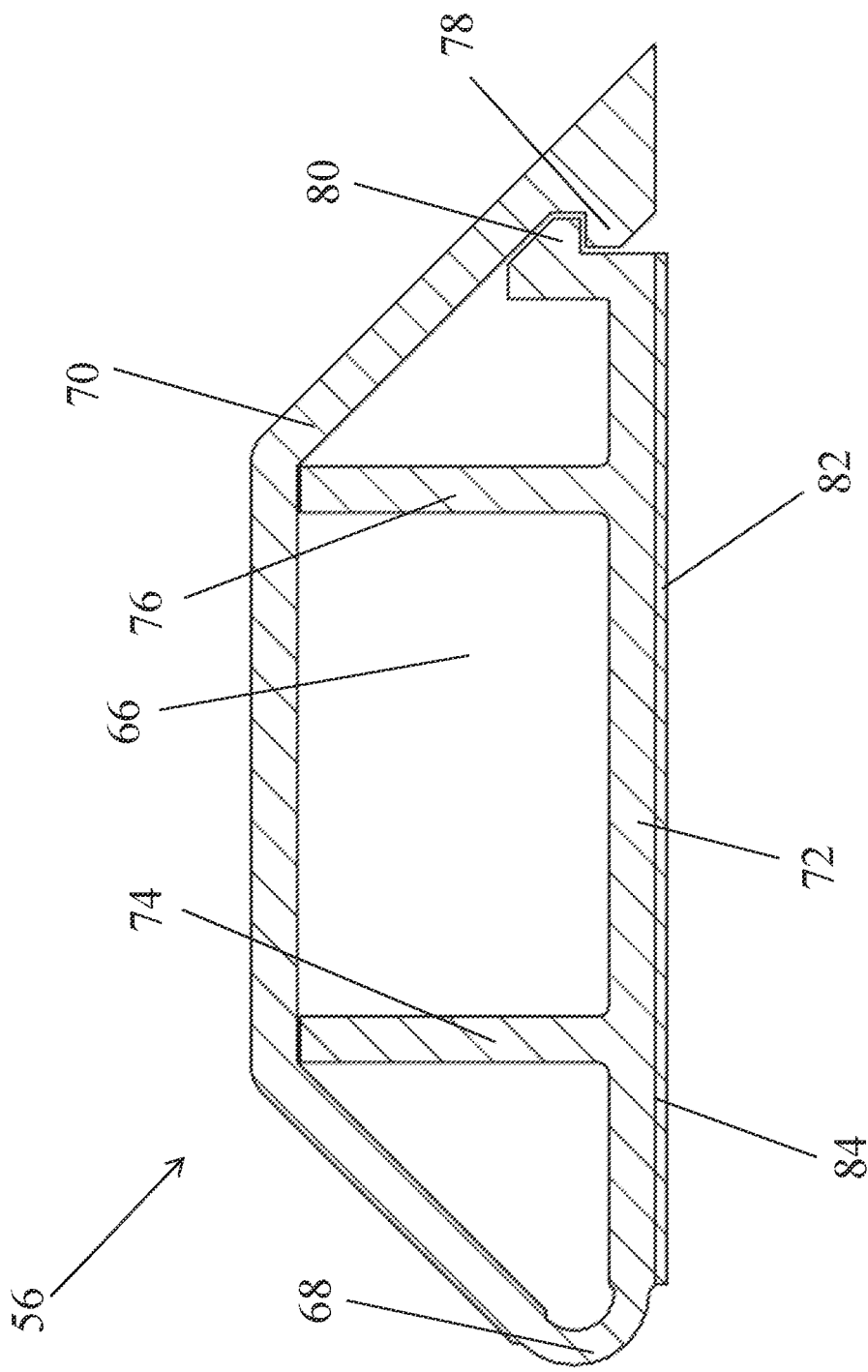
FIG. 9 is a cross sectional view of the cord protector of FIG. 5.

FIG. 9 depicts a cross sectional view of the elongated body 56. The elongated body 56 extends between the first end 52 and the second end 54. The elongated body has a cord track 66, a hinge 68, such as a living hinge 68, and a lid 70. The cord track 66 provides a space in which cords can rest. The cord track 66 has a base 72, a first track wall 74, and a second track wall 76. The first track wall 74 and the second track wall 76 both extend upward from the base 72, and are spaced apart to allow at least one cord to rest between the first track wall 74 and the second track wall 76. Like the first embodiment, the embodiment with the living hinge may be manufactured through extrusion.

The hinge 68 is coupled to the base 72 adjacent the point where the first track wall 74 extends upward from the base 72. The hinge 68 may be a living hinge. The lid 70 may be separately attached to the hinge 68, or may be extruded or otherwise molded to form the lid 70 and the base 72 as a single, integral, common material piece. However it is formed, the lid 70 is configured to rotate about the hinge 68 to cover the cord track 66. The lid 70 has a lid latch 78. The base 72 has a base latch 80 adjacent the point where the second track wall 76 extends upward from the base 72. The base latch 80 is configured to releasably couple with the lid latch 78 of the lid 70.

Like with all previous embodiments, the base 72 may have a gripping material 82 coupled to the bottom surface 84 of the base 72. The gripping material 38 is configured to attach the cord protector 10 to a surface on which the cord protector 10 rests. Without limitation, the gripping material 38 may be a hook-type fabric that attaches to carpet, an adhesive configured to grip a hard surface, such as double-sided tape, a rubberized coating to increase friction between the bottom surface 40 of the base 16 and the surface on which the cord protector 10 rests, or some other friction enhancing material known in the art.

Figure 10:
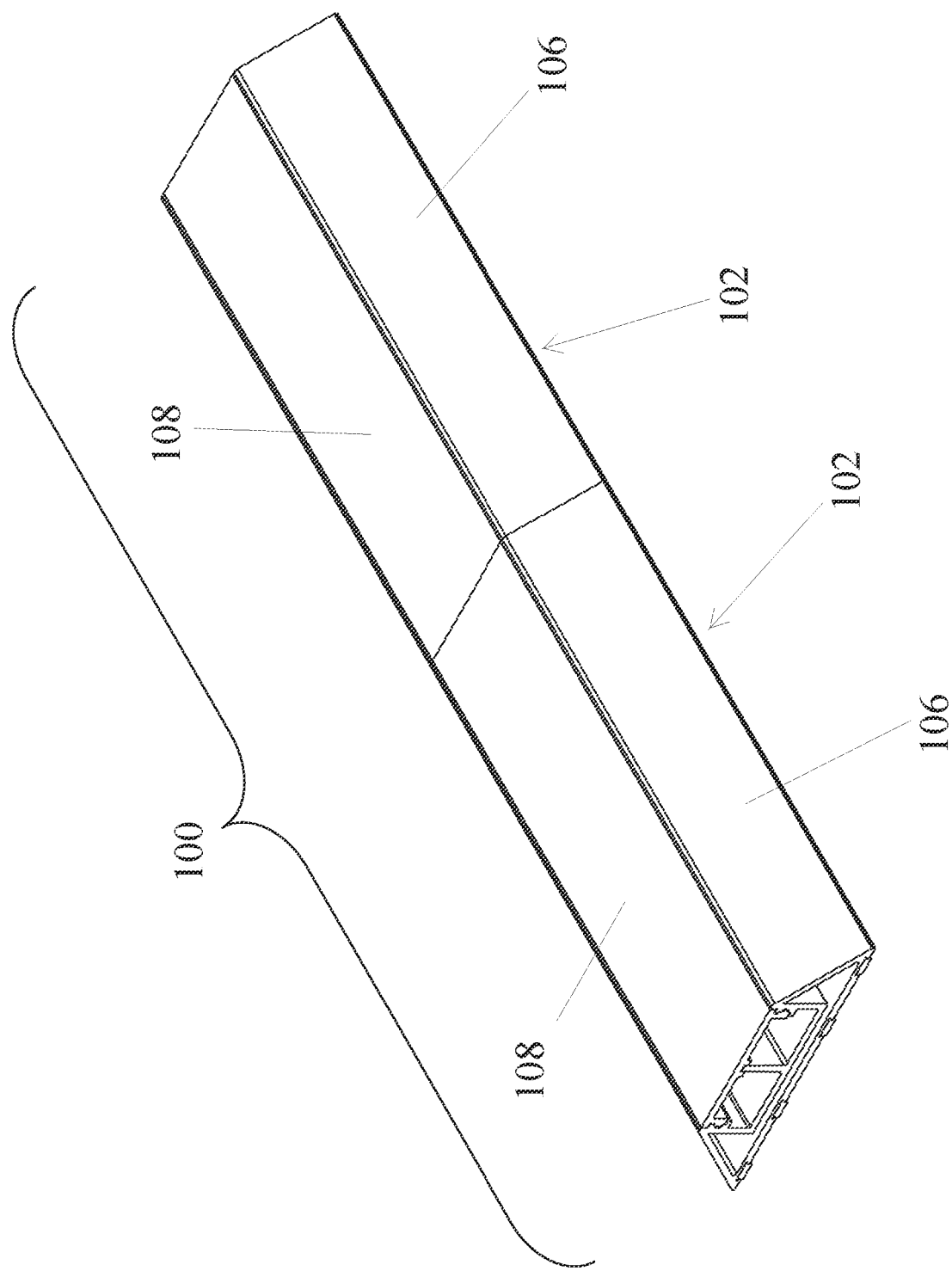
FIG. 10 is a perspective view of another embodiment of a cord protector joined by a coupler to a second cord protector.
Figure 11:
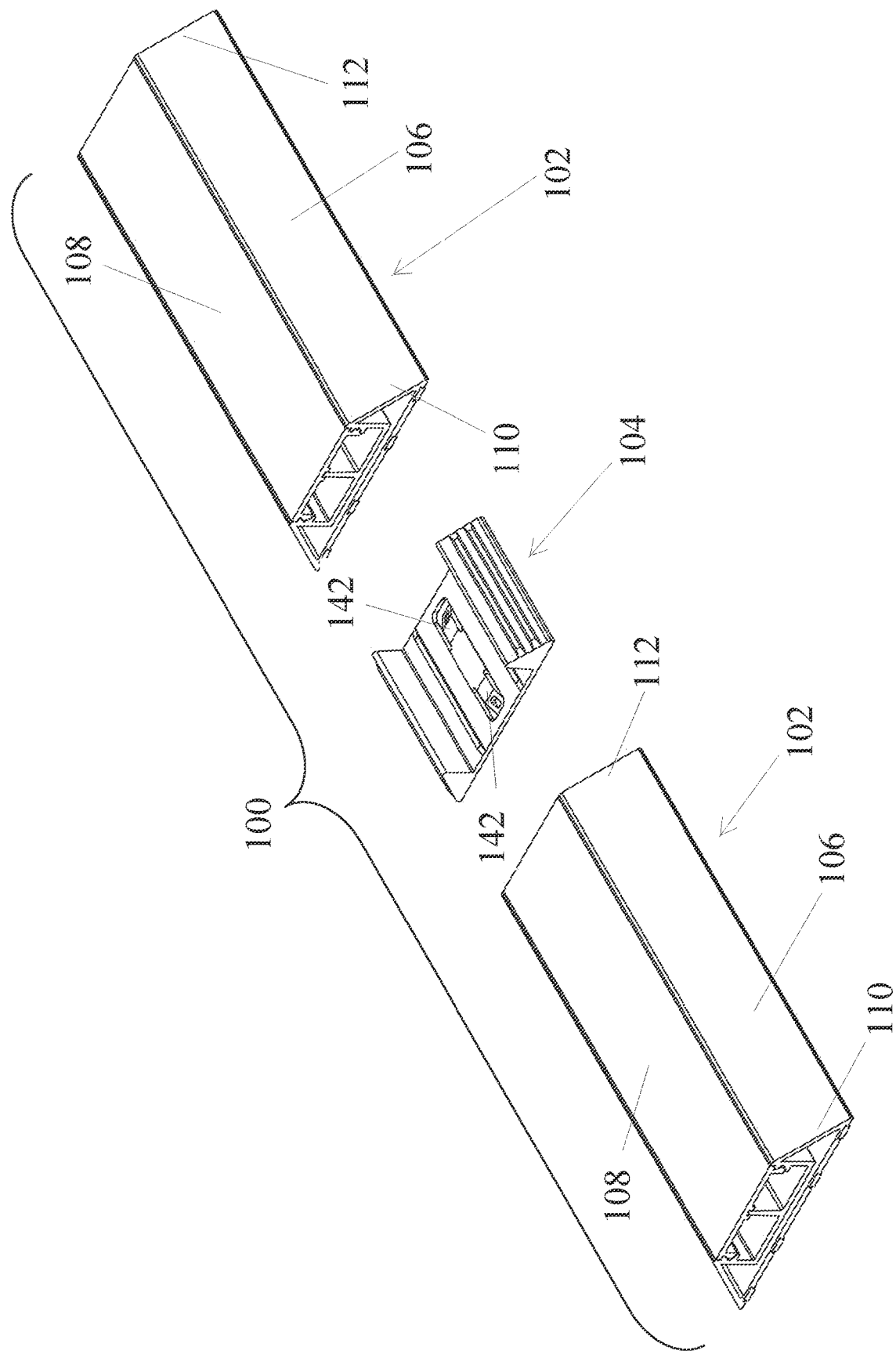
FIG. 11 is an exploded view of the cord protector shown in FIG. 10, showing the coupler used to join multiple cord protrectors.
Figure 12:
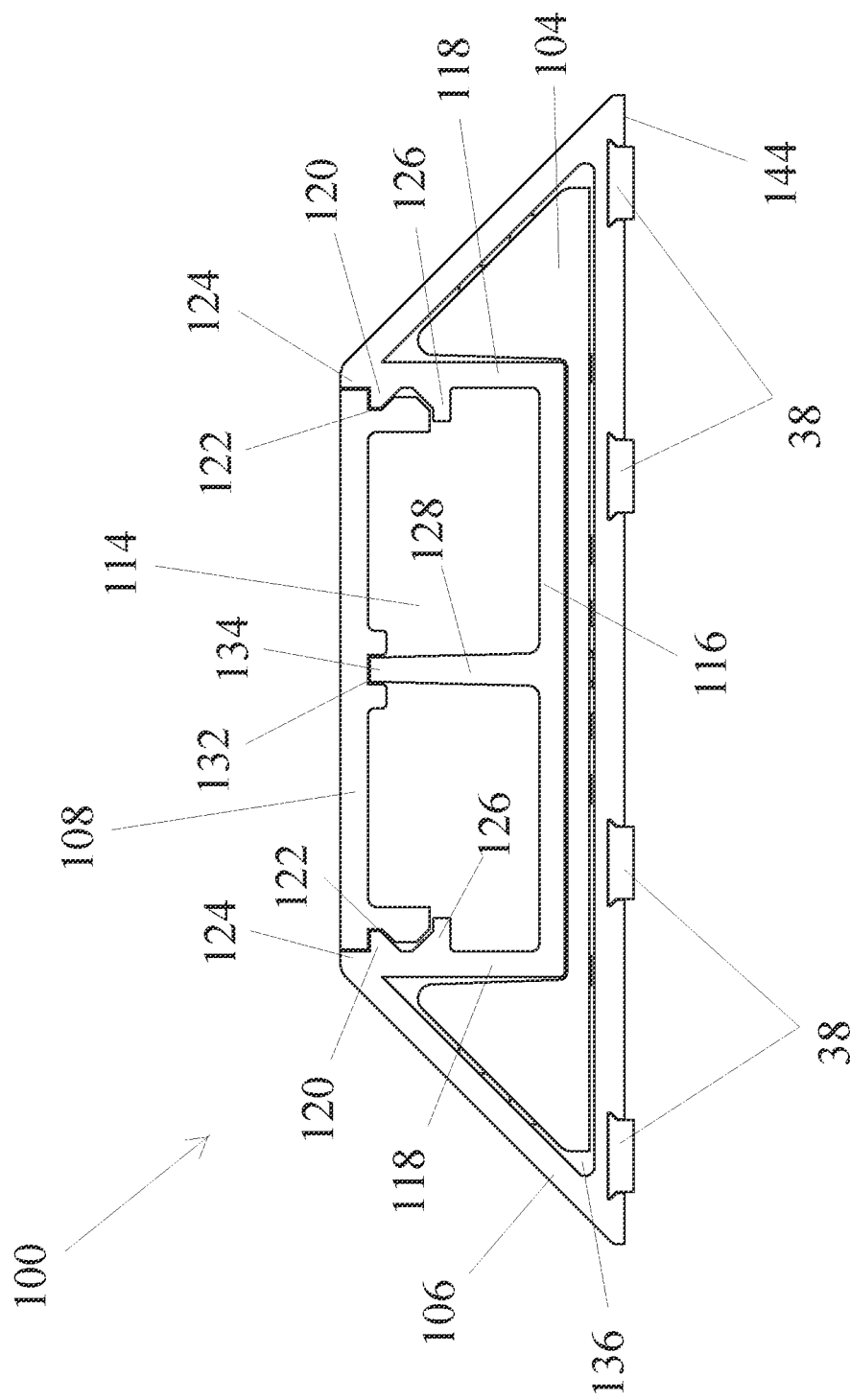
FIG. 12 is an end view of the cord protector shown in FIG. 10.

The present application is also related to a cord protector 100. As shown in FIGS. 10-12, the cord protector 100 may comprise at least one elongated body 102 and at least one coupler 104. The coupler 104 is configured to join two elongated bodies 102 together to form an elongated cord protector system as shown in FIGS. 10 and 11. Thus, while the cord protector 100 may only comprise a single elongated body 102, the cord protector 100 may also comprise any number of elongated bodies 102 and couplers 104, depending on the length of cord to be protected. Thus, the cord protector 100 may also comprise at least two elongated bodies 102 and at least one coupler 104, and any other combination.

Each elongated body 102 may have a base 106 and a lid 108. The base 106 may have a first end 110, a second end 112 opposite the first end 110, and a channel 114 extending between the first end 110 and the second end 112. The channel 114 may be formed with a floor 116 and two walls 118. The channel 114 defines a protected space for cords and other elongated objects. The lid 108 is configured to be inserted into and cover the channel 114. The channel 114 may also have a plurality of ridges 120 extending into the channel 114. The ridges 120 are configured to interface with the lid 108 to couple the lid 108 to the base 106. For example, the lid 108 may have a plurality of grooves 122 that are configured, or sized and shaped, to receive one of the ridges 120. The ridges 120 may extend longitudinally along the channel 114 and the grooves 122 may extend longitudinally along the lid 108. Any number of ridges 120 and/or grooves 122 may be implemented. In a particular embodiment, the base 106 has two ridges 120 and two grooves 122. Each of the ridges 120 may extend into the channel 114 adjacent a top edge 124 of one of the walls 118 of the channel 114. The lid 108 may be inserted into the channel 114 by sliding into the channel 114 from one of the first end 110 or the second end 112 of the base 106, with each of the ridges 120 inside one of the grooves 122. The lid 108 may also be inserted into the channel 114 by snapping the grooves 122 of the lid 108 around the ridges 120 of the base 106. The base 106 may also have a plurality of ledges 126 configured to support the lid 108 when the lid 108 is inserted into the channel 114. Each of the ledges 126 may extend into the channel 114 below the ridges 120, thus permitting the lid 108 to be supported by the ledges 126 when the ridges 120 are inserted into the grooves 122.

Figure 13:
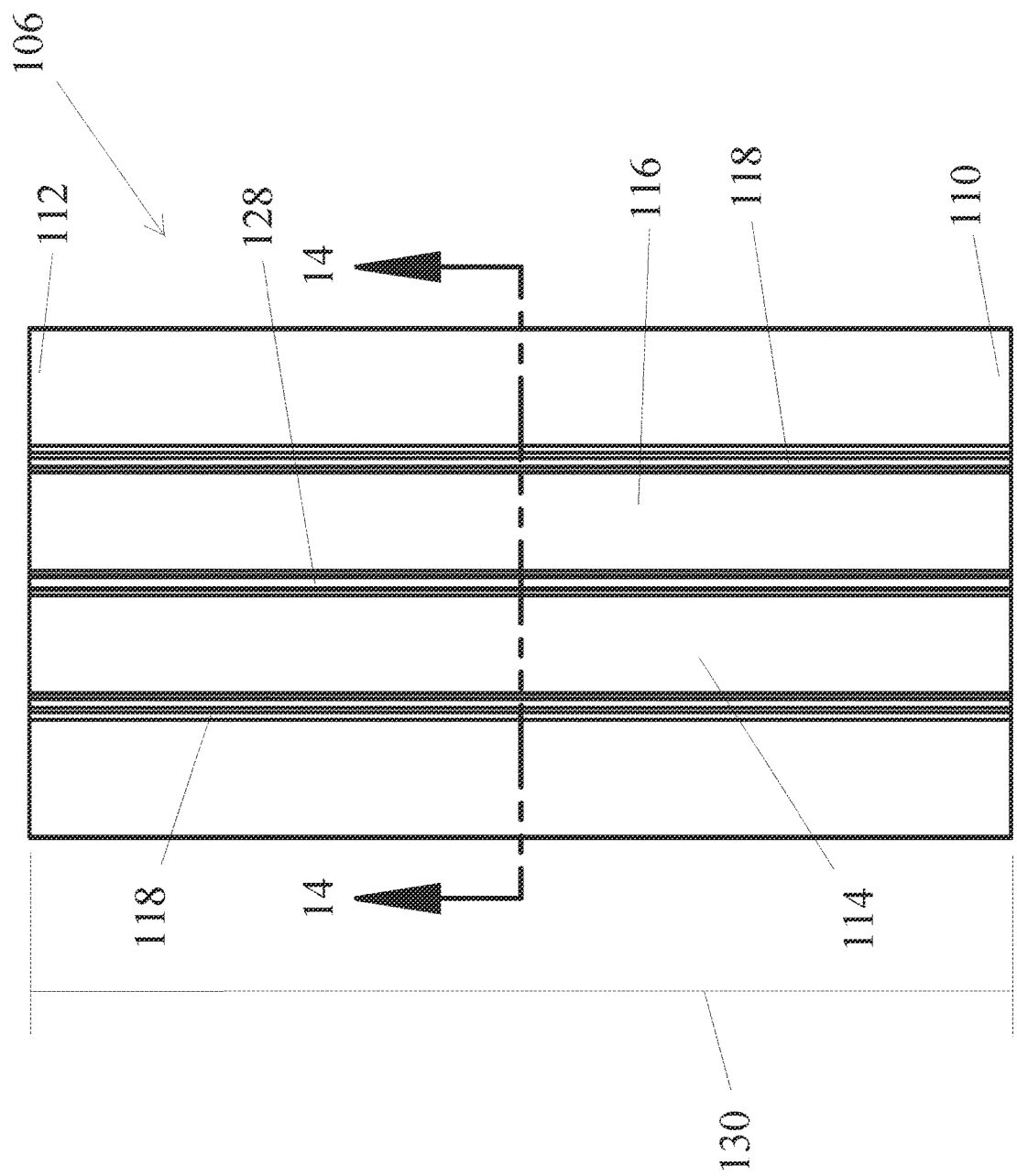
FIG. 13 is a top view of the cord protector shown in FIG. 10 with the lid removed.
Figure 14:
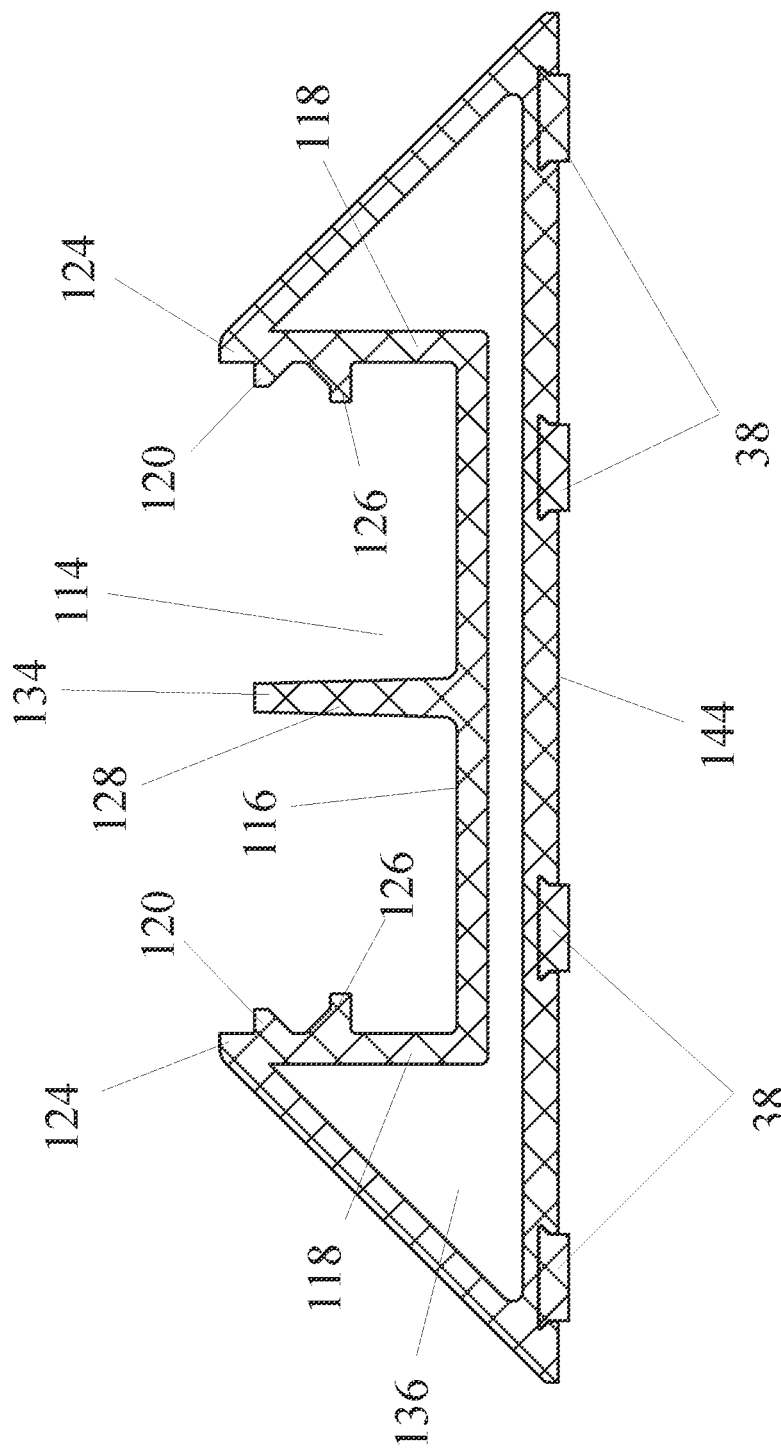
FIG. 14 is a cross section view taken from line 14-14 shown in FIG. 13.

As shown in FIGS. 12-14, the base 106 may also have a central pillar 128 extending from the floor 116 into the channel 114. The central pillar 128 may extend from the floor 116 into the channel 114 for a majority of a length 130 of the channel 114. The central pillar 128 may extend longitudinally within the channel 114. The central pillar 128 is configured to support the lid 108 when the lid 108 is inserted into the channel 114 to help prevent the central portion of the lid 108 from caving in when pressure or a force is applied to the lid 108. To help secure the connection between the central pillar 128 and the lid 108, the lid 108 may have a slot 132 configured to receive a top 134 of the central pillar 128.

Figure 15:
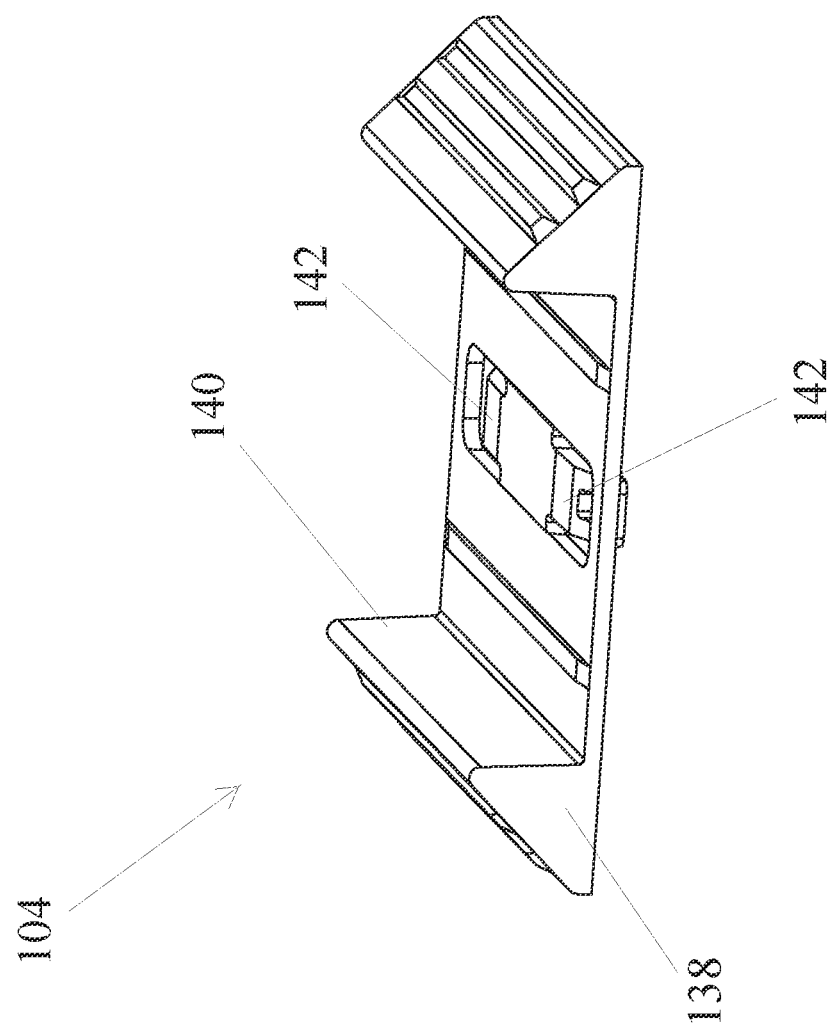
FIG. 15 is a perspective view of the coupler shown in FIG. 11.

The base 106 may also have a cavity 136 longitudinally disposed in each of the first end 110 and the second end 112. The cavity 136 is configured to receive the coupler 104 to join multiple elongated bodies 102 together. Thus, as shown in FIGS. 11 and 15, the coupler 104 may have a leading end 138 configured to mate with the cavity 136 in the first end 110 of a first of the elongated bodies 102 and a trailing end 140 that is configured to mate with the cavity 136 in the second end 112 of a second of the elongated bodies 102. The cavity 136 may be separate from the channel 114 to help prevent the cord from interfering with inserting the coupler 104 into the cavity 136. The coupler 104 may also have at least one tab 142 that is configured to improve the connection between the coupler 104 and the elongated body 102. The tab 142 is moveable between a protruding position where the tab 142 extends below the coupler 104 (see FIG. 15) and an aligned position where the tab 142 is aligned with the coupler 104. The tab 142 may be biased toward the protruding position. In addition, the cavity 136 may be shaped so that when the tab 142 is in the protruding position, the coupler 104 does not fit into the cavity 136 and when the tab 142 is in the aligned position, the coupler 104 does fit into the cavity 136. Thus, to insert the coupler 104 into the cavity 136, the tab 142 must be moved to the aligned position. Once inserted into the cavity 136, the tab 142 exerts a force against the base 106 within the cavity 136 due to the bias of the tab 142 toward the protruding position. This improves the connection between the coupler 104 and the elongated body 102 because friction between the coupler 104 and the base 106 is increased and a greater force is required to remove the coupler 104 from the cavity 136 than would otherwise be required. The bias of the tab 136 toward the protruding position may be due to the shape of the coupler 104 when molded, and not due to any additional component, such as a spring. For example, as shown in FIG. 15, the tab 136 may be molded in the protruding position. Because the material of the coupler 104 is slightly flexible, the tab 136 can be moved to the aligned position but will experience a bias back towards the protruding position.

As disclosed with reference to other embodiments, the cord protector 100 may comprise a gripping material 38 coupled to a bottom surface 144 of the base 106. With any of the embodiments disclosed herein, the cord protector 10, 50, 56, 100 may be of a unitary construction, with all components being formed together at the same time in one manufacturing process, such as through extrusion or injection molding. The cord protector 10, 50, 56, 100 may be constructed of a rigid material, sufficiently rigid to support the weight of a person walking on or a vehicle rolling across the cord protector.

It will be understood that expandable cord protector implementations are not limited to the specific assemblies, devices and components disclosed in this document, as virtually any assemblies, devices and components consistent with the intended operation of an expandable cord protector may be utilized. Accordingly, for example, although particular cord protectors, covers, lids, sleeves, latches, snap-fit couplers, hinges, frames, enclosures, bubble covers, housings, joints, protrusions, ledges, clamps, grooves, ridges, couplers, fasteners, power sockets, and other assemblies, devices and components are disclosed, such may include any shape, size, style, type, model, version, class, measurement, concentration, material, weight, quantity, and/or the like consistent with the intended operation of a cord protector implementation. Implementations are not limited to uses of any specific assemblies, devices and components; provided that the assemblies, devices and components selected are consistent with the intended operation of an expandable cord protector.

Accordingly, the components defining any expandable cord protector implementations may be formed of any of many different types of materials or combinations thereof that can readily be formed into shaped objects provided that the components selected are consistent with the intended operation of a cord protector implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of cord protector implementations may vary according to different implementations.

Various cord protector implementations may be manufactured using conventional procedures as added to and improved upon through the procedures described here. Some components defining cord protector implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of expandable cord protectors are not limited to the specific order of steps as disclosed in this document. Any steps or sequence of steps of the assembly of cord protectors indicated herein are given as examples of possible steps or sequence of steps and not as limitations, since various assembly processes and sequences of steps may be used to assemble expandable cord protectors.

The cord protector implementations described are by way of example or explanation and not by way of limitation. Rather, any description relating to the foregoing is for the exemplary purposes of this disclosure, and implementations may also be used with similar results for a variety of other applications requiring an expandable cord protector.

What is claimed is:

1. A cord protector, comprising:
    at least one elongated body having:
        a base having a first end, a second end, a channel extending between the first end and the second end, the channel defined by first and second sidewalls, a central pillar extending from a floor of the channel into the channel between the first and second sidewalls, and at least one ledge extending into the channel separate from at least one ridge, wherein the at least one ledge is positioned below a top of the at least one ridge; and
        a lid configured to be inserted into and cover the channel, the lid having at least one groove sized and shaped to receive the at least one ridge, wherein the central pillar and the at least one ledge support the lid when the lid is inserted into the channel; and
    at least one coupler having a leading end and a trailing end, the leading end configured to mate with the first end of the at least one elongated body.

2. The cord protector of claim 1, the base further having a cavity separate from the channel disposed in each of the first end and the second end, wherein a leading end of the at least one coupler is configured to mate with the cavity of the first end of the at least one elongated body.

3. The cord protector of claim 1, the lid further having a slot configured to receive a top of the central pillar when the lid is inserted into the channel.

4. The cord protector of claim 1, wherein the at least one ridge extends from the channel adjacent a top edge of the channel.

5. The cord protector of claim 1, the at least one coupler further having at least one tab moveable between a protruding position wherein the at least one tab extends below the at least one coupler and an aligned position wherein the at least one tab is aligned with the at least one coupler, wherein the at least one tab is biased toward the protruding position.

6. The cord protector of claim 1, wherein the lid is inserted into the channel by snapping the at least one groove of the lid around the at least one ridge of the base.

7. The cord protector of claim 1, wherein the central pillar extends from the floor into the channel for a majority of a length of the channel.

8. A cord protector, comprising:
    an elongated body having:
        a base comprising a channel having sidewalls and extending between a first end and a second end of the base, the channel having at least one ridge in at least one of the sidewalls adjacent a top of the sidewalls;
        a central pillar extending from a floor of the channel into the channel between the sidewalls and at least one ledge extending into the channel from at least one of the sidewalls, wherein the at least one ledge is positioned below a top of the at least one ridge;
        a lid configured to be inserted into and cover the channel, wherein the central pillar, and the at least one ledge, support the lid when the lid is inserted into the channel; and
    at least one coupler having a leading end and a trailing end, the leading end configured to mate with the first end of the elongated body.

9. The cord protector of claim 8, the base further having a cavity separate from the channel disposed in the first end, wherein the leading end of the at least one coupler is configured to mate with the cavity of the first end of the at least one elongated body.

10. The cord protector of claim 8, the lid further having a slot configured to receive a top of the central pillar when the lid is inserted into the channel.

11. The cord protector of claim 8, the at least one coupler having at least one tab moveable between a protruding position, wherein the at least one tab extends below the at least one coupler, and an aligned position, wherein the at least one tab is aligned with the at least one coupler, and wherein the at least one tab is biased toward the protruding position.

12. The cord protector of claim 8, wherein the central pillar extends from the floor into the channel for a majority of a length of the channel.

13. The cord protector of claim 8, wherein the lid having at least one groove configured to receive the at least one ridge.

14. The cord protector of claim 13, wherein the lid is inserted into the channel by snapping the at least one groove of the lid around the at least one ridge of the base.

15. A cord protector, comprising: an elongated body having:
- a channel extending between a first end and a second end of the base, the channel being defined by sidewalls and having at least one ridge and at least one ledge extending into the channel from the sidewalls, wherein the at least one ledge is positioned below a top of the at least one ridge;
- a pillar extending into the channel from a floor of the channel between the sidewalls;
- a lid configured to be inserted into and cover the channel, wherein the pillar, and the at least one ledge, support the lid when the lid is inserted into the channel; and
- the base further having a cavity separate from the channel disposed in the first end, wherein a leading end of at least one coupler is configured to mate with the cavity of the first end of the at least one elongated body.

16. The cord protector of claim 15, wherein the lid having at least one groove configured to receive the at least one ridge.

17. The cord protector of claim 16, wherein the lid is inserted into the channel by snapping the at least one groove of the lid around the at least one ridge of the base.

18. The cord protector of claim 15, wherein the pillar extends from the floor into the channel for a majority of a length of the channel.

* * * * *